(12) United States Patent
Schaefer et al.

(10) Patent No.: US 8,613,575 B2
(45) Date of Patent: Dec. 24, 2013

(54) INDEXABLE CUTTING INSERT

(75) Inventors: Hans Schaefer, Gomaringen (DE);
Peter Langer, Rottenberg (DE)

(73) Assignee: Hartmetall-Werkzeugfabrik Paul Horn GmbH, Tubingen (DE)

( * ) Notice: Subject to any disclaimer, the term of this patent is extended or adjusted under 35 U.S.C. 154(b) by 994 days.

(21) Appl. No.: 12/595,386

(22) Filed: Oct. 9, 2009

(65) Prior Publication Data
US 2013/0183110 A1    Jul. 18, 2013

Related U.S. Application Data

(63) Continuation of application No. PCT/EP2008/001149, filed on Feb. 15, 2008.

(30) Foreign Application Priority Data

Apr. 25, 2007 (DE) .......................... 10 2007 019 463

(51) Int. Cl.
*B23B 27/16* (2006.01)

(52) U.S. Cl.
USPC .......................................... 407/107; 407/113

(58) Field of Classification Search
CPC ..................................................... B23B 27/16
USPC ...................... 407/107–109, 111–113, 46, 47
See application file for complete search history.

(56) References Cited

U.S. PATENT DOCUMENTS

| | | | | | |
|---|---|---|---|---|---|
| 1,180,377 | A | * | 4/1916 | Conklin | 83/840 |
| 3,939,230 | A | * | 2/1976 | Simon | 261/50.2 |
| 5,035,545 | A | * | 7/1991 | Zinner | 407/110 |
| 5,993,118 | A | * | 11/1999 | Brask et al. | 407/110 |
| 6,249,950 | B1 | | 6/2001 | Brask | |
| 2006/0216121 | A1* | | 9/2006 | Edler et al. | 407/104 |

FOREIGN PATENT DOCUMENTS

| | | |
|---|---|---|
| AT | 006939 U1 | 6/2004 |
| DE | 2644068 C2 | 8/1976 |
| DE | 7629302 U1 | 1/1977 |
| DE | 8214831.7 U1 | 6/1991 |
| DE | 202005019134 U1 | 3/2006 |
| DE | 102005019945 A1 | 11/2006 |
| EP | 0568513 A1 | 11/1993 |
| JP | 2005066707 | 3/2005 |

OTHER PUBLICATIONS

International Search Report for PCT Application No. PCT/EP2008/001149 completed May 23, 2008 and mailed Jun. 2, 2008, 4 pages.

* cited by examiner

*Primary Examiner* — Daniel Howell
*Assistant Examiner* — Ryan Rufo
(74) *Attorney, Agent, or Firm* — Turocy & Watson, LLP

(57) ABSTRACT

The present invention relates to an indexable cutting insert which is provided with at least two bearing surfaces for securing to a holder, said at least two bearing surfaces being each subdivided into individual subsurfaces, wherein the at least two bearing surfaces, with respect to a center plane of the cutting insert, forms at least three edges in one half of said cutting insert, said edges bounding the subsurfaces for the formation of crowning, approximating to convexity, of the at least two bearing surfaces.

13 Claims, 3 Drawing Sheets

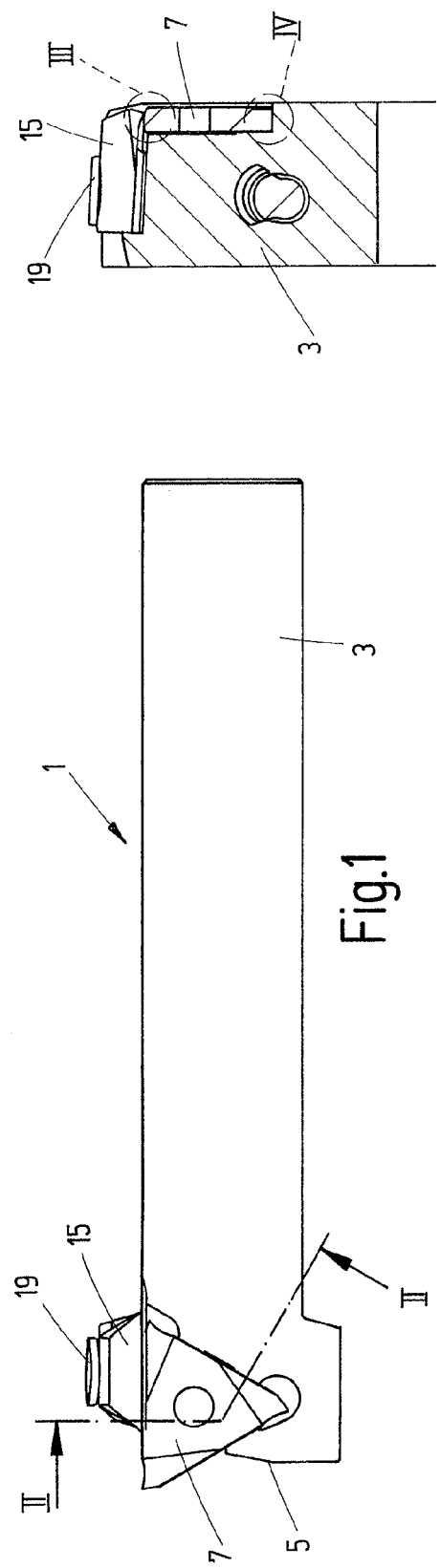
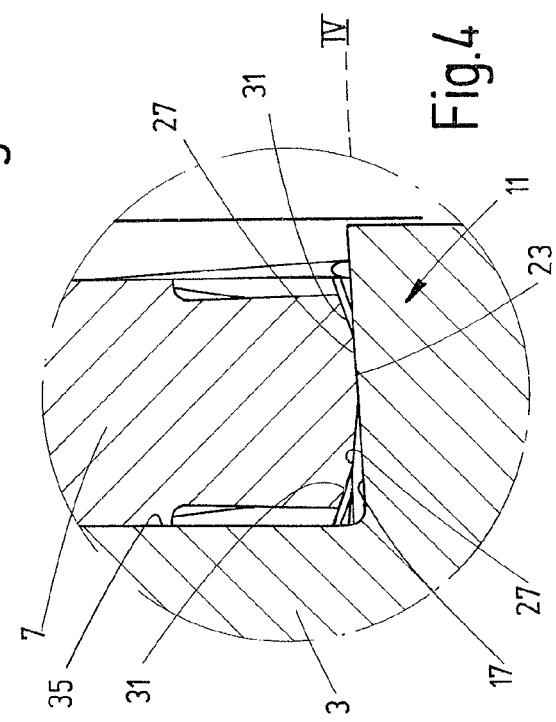
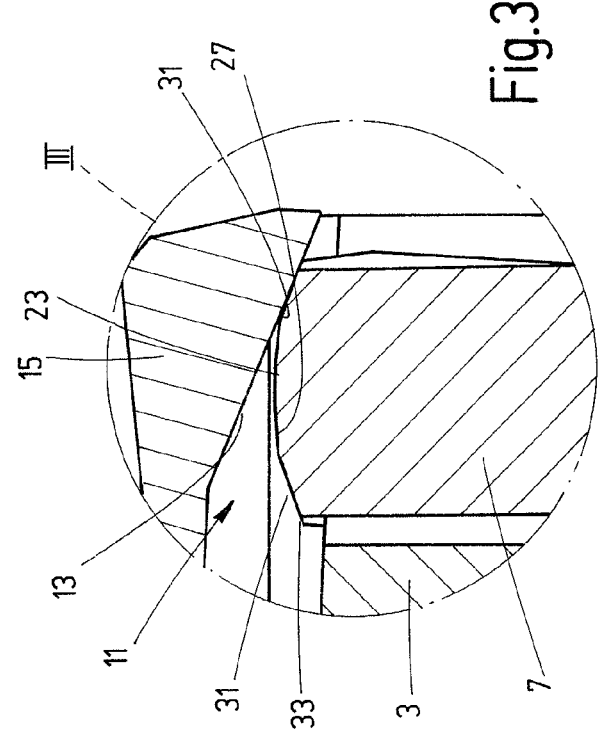

US 8,613,575 B2

INDEXABLE CUTTING INSERT

CROSS-REFERENCE TO RELATED APPLICATIONS

This is a Continuation application of International patent application PCT/EP 2008/001149, filed 15 Feb. 2008, which claims the priority of German patent application DE 10 2007 019 463.5, filed 25 Apr. 2007.

BACKGROUND OF THE INVENTION

Brief Summary of the Invention

The invention relates to an indexable cutting insert which is provided with a bearing surface for securing to a holder, said bearing surface being subdivided into individual subsurfaces. The subject matter of the invention is also a tool system consisting of tool holder and cutting tool.

RELATED PRIOR ART

Tool systems consisting of tool holder and cutting body are known and are used, inter alia, as grooving tools. DE 26 44 068 C2 shows, for example, such a grooving tool in which an indexable cutting insert of the type mentioned at the beginning is used as cutting tool. According to this prior art, the holder has a clamping screw for securing a triangular, flat indexable cutting insert disposed on end, by means of which clamping screw a clamping shoe which overlaps a marginal region of the indexable cutting insert clamps the latter in place in a seat of the holder. In order to assist the precise centering of position when the indexable cutting insert is being clamped in place in the seat, the bearing surfaces interacting with the clamping surfaces on the holder are subdivided into subsurfaces which are arranged like a polygon and form contouring in order to avoid bearing over a large surface area in the regions transmitting the clamping force.

Tools having a clamp mechanism are also known from U.S. Pat. No. 6,249,950 B1, JP 2005-66707, DE 82 14 831 U1 and EP 568 513 A1.

SUMMARY OF THE INVENTION

The object of the present invention is to provide an indexable cutting insert in which the shaping of the bearing surfaces interacting with the seat of the holder is optimized.

According to the invention, this object is achieved by an indexable cutting insert having an indexable cutting insert which is provided with at least two bearing surfaces for securing it to a holder, said bearing surface being each subdivided into individual subsurfaces, wherein the at least two bearing surfaces, with respect to a center plane of the cutting insert, each form at least three edges in one half of said cutting insert, said edges bounding the subsurfaces for the formation of crowning, approximating to convexity, of the at least two bearing surfaces, wherein the at least two bearing surfaces are each bounded by three respective edges in both halves, starting from the center plane, of the cutting insert, such that the at least two bearing surfaces of the cutting insert are each subdivided into five subsurfaces, wherein the at least two bearing surfaces are identically formed and arranged such that one bearing surface is provided for resting against a mating surface within the seat and that the other bearing surface is provided for pressing of a clamping shoe of the holder.

An essential special feature of the invention accordingly consists in the fact that a finer subdivision of the bearing surfaces compared with the prior art is provided in such a way that crowning approximating to convexity is obtained at the bearing surfaces. This crowning firstly results in the advantage that the clamping force takes place with high surface pressure on account of the small contact surfaces. Secondly, the crowning can ensure that, during the clamping in place, in interaction with corresponding slightly sloping clamping surfaces of the holder, a transverse force component is produced on the indexable cutting insert which brings the latter, during the clamping operation, automatically into a desired position which is defined by positive locking and which therefore "centers", as it were, the indexable cutting insert.

In especially advantageous exemplary embodiments, the at least two bearing surfaces are each not only formed on one side on the indexable cutting insert, but rather the arrangement is made in such a way that three respective edges are formed in both halves, starting from the center plane, of the cutting insert, such that the bearing surface is subdivided into five subsurfaces (thus being arranged like a polygon), which leads to especially favorable crowning. If the at least two bearing surfaces are each of identical configuration in both halves of the cutting insert in this case, such that the indexable cutting insert is configured symmetrically to the center plane, more universal use of the indexable cutting insert in conjunction with tool holders of different configuration is possible. The cutting insert can be used in right-hand and left-hand clamping holders.

The bearing surfaces are preferably configured in such a way that a central subsurface extending on both sides of the center plane defines a plane perpendicular to the center plane. As a result, the clamping force is transmitted on that side of the indexable cutting insert that is remote from the clamping shoe primarily in the central region of the bearing surface.

The subsurfaces situated on both sides of the central subsurface preferably form inner secondary surfaces and outer secondary surfaces which are in each case likewise planar surfaces, but have a greater width than the central subsurface, wherein the inner secondary surfaces are set back relative to the central subsurface by a first angle of inclination and the outer secondary surfaces are in turn set back relative to the central subsurface by a greater angle of inclination, the angles of inclination being selected in such a way that optimum crowning results.

According to another aspect the subject matter of the invention is also a tool system consisting of tool holder and cutting tool, the cutting tool provided being an indexable cutting insert according to the present invention.

BRIEF DESCRIPTION OF THE SEVERAL VIEWS OF THE DRAWING

The invention is explained in detail below with reference to an exemplary embodiment shown in the drawing, in which:

FIG. 1 shows a side view, depicted slightly enlarged compared with a practical embodiment, of a tool system having an exemplary embodiment of an indexable cutting insert according to the invention;

FIG. 2 shows a partial cross section, depicted enlarged compared with FIG. 1, along section line II-II in FIG. 1;

FIGS. 3 and 4 show partial cross sections, depicted greatly enlarged compared with FIG. 2, of the regions d.esignated by III and IV, respectively, in FIG. 2;

DETAILED DESCRIPTION OF THE INVENTION

Figure 5:
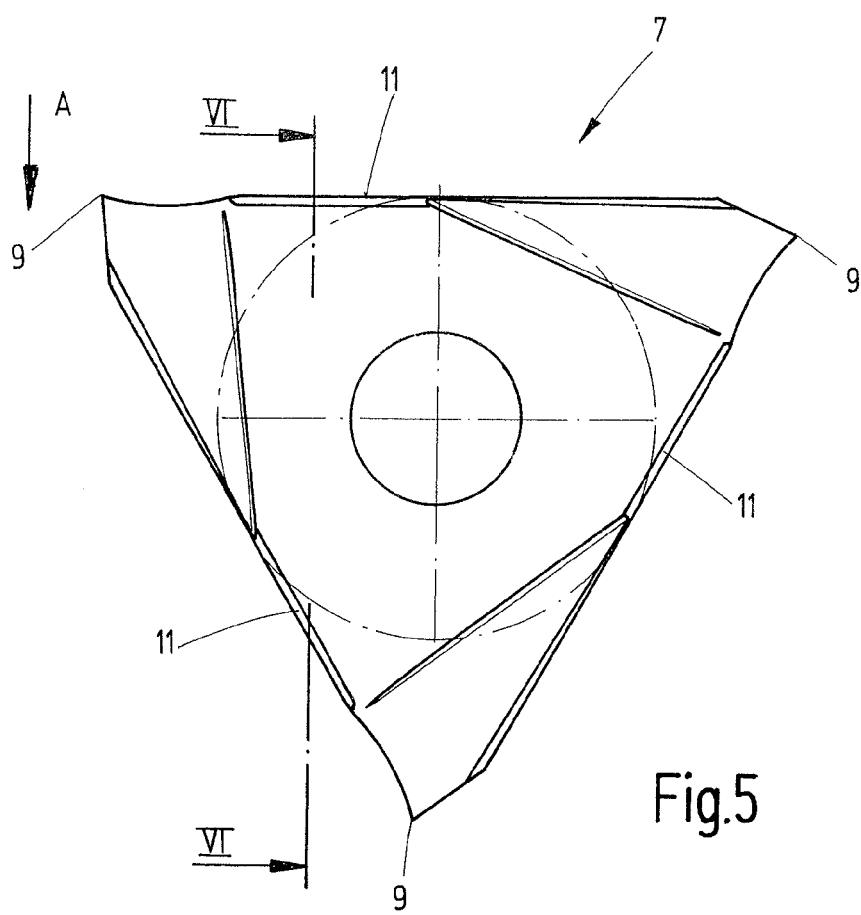
FIG. 5 shows a side view, depicted approximately 5 times enlarged compared with a practical embodiment, of the exemplary embodiment of the indexable cutting insert.

A holder designated by 1 in FIG. 1 has a shank 3 of quadratic cross section. At the front end 5, the holder 1 has a seat for an indexable cutting insert 7 which forms a flat, disc-like body which, as can best be seen from FIG. 5, is of triangular form and is made of a carbide material. In a linear region between the three cutting edges 9, a respective bearing surface 11 is formed on the indexable cutting insert 7, said bearing surface 11, for securing the cutting insert 7 to the holder 1, interacting with clamping surfaces on the holder 1. As FIGS. 1 to 4 show, these clamping surfaces are a sloping surface 13 on a clamping shoe 15 and mating surfaces on the holder 3, of which one can be seen in FIG. 4 and is designated by 17. The clamping shoe 15 can be clamped against the associated bearing surface 11 of the cutting insert 7 by means of a clamping screw 19, wherein, as can best be seen from FIG. 3, the sloping surface 13 transmits the clamping force to the associated bearing surface 11, and this clamping force presses the opposite bearing surfaces 11 against the corresponding mating surfaces 17 of the seat on the shank 3, see in particular FIGS. 3 and 4.

Figure 7:
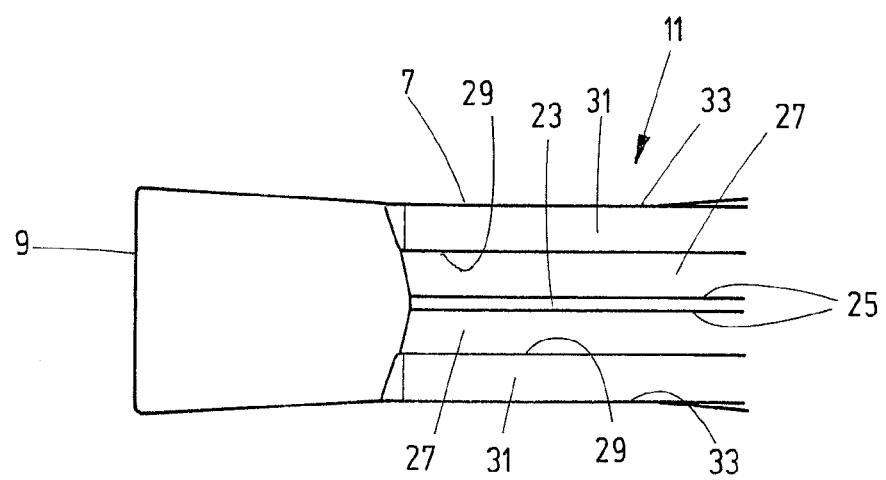
FIG. 7 shows a partial plan view, likewise depicted on an exaggerated scale, of the indexable cutting insert, as viewed in the direction of view according to arrow A in FIG. 5.
Figure 6:
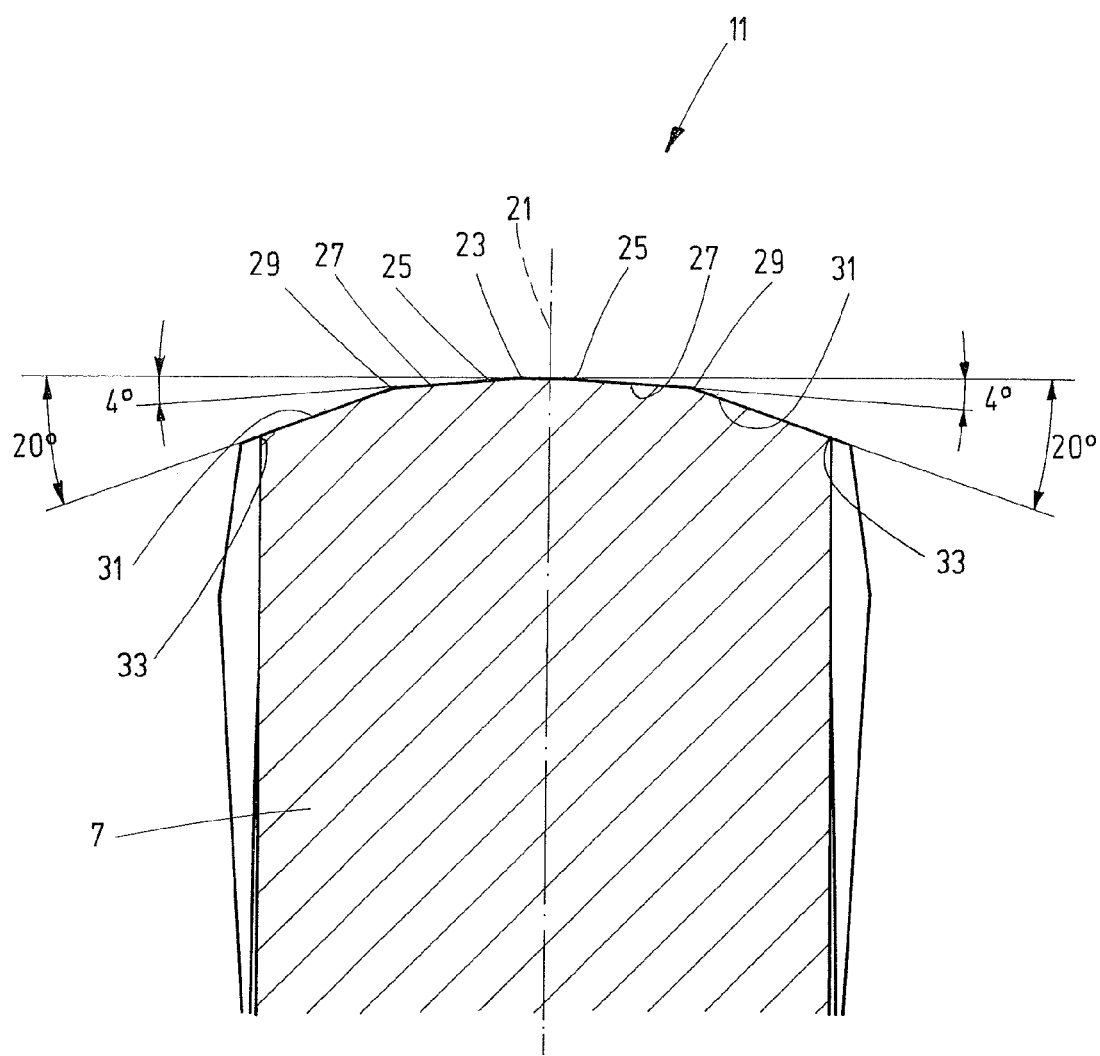
FIG. 6 shows a partial cross section, depicted enlarged to an even greater extent compared with FIGS. 3 and 4, of only that marginal region of the indexable cutting insert which adjoins a bearing surface, the position of the section plane being indicated in FIG. 5 by a line VI-VI.

As can best be seen from FIGS. 6 and 7, the bearing surfaces 11 are each subdivided into planar subsurfaces, namely into a central subsurface 23 which is situated centrally with respect to the center plane 21 (FIG. 6) of the cutting insert 7 and extends on both sides of the center plane 21. The central subsurface 23 is bounded by edges 25, adjoining which are further subsurfaces in the form of inner secondary surfaces 27, which are in turn bounded on the outside by edges 29, adjoining which are outer secondary surfaces 31.

As can best be seen from FIG. 6, the central subsurface 23 lies in a plane perpendicular to the center plane 21. The adjoining, planar inner subsurfaces 27 are set back relative to the central subsurface 23 by a first angle of inclination, which in the present example is four angular degrees. The outer secondary surfaces 31 which adjoin further on the outside and extend from the edges 29 up to the outer edges 31 of the cutting body 7 are in turn set back by a further, second angle of inclination, which is greater than the first angle of inclination and in the present example is 20 angular degrees. The edges 25, 29 and 33 bounding the subsurfaces therefore form a polygon, wherein, at the angles of inclination selected, a contour of the bearing surfaces 11 that approximates to convex crowning is formed.

As shown in particular by FIG. 7, the central subsurface 23 has the smallest width of the subsurfaces, which corresponds to approximately one third of the width of the inner secondary surfaces 27 and of the outer secondary surfaces 31.

With this geometry of the interacting, clamping surfaces, the central subsurfaces 23 of the cutting insert 7 are in contact with the associated mating surfaces 17 on the seat of the holder 1 over a relatively small area during the clamping operation. In addition, the interaction of the sloping surface 13 of the clamping shoe 15 with the facing outer secondary surface 31 of the cutting insert 7 leads to a force component which is effective transversely to the line of action of the clamping force and which, during the clamping operation, thrusts the cutting insert 7 to the left, in the direction of view in accordance with FIGS. 3 and 4, for positive-locking bearing against a lateral boundary surface 35 (see FIG. 4) on the seat in the shank 3 of the holder 1. This helps to achieve a desired position of the cutting insert 7 in the seat during the clamping operation. Thanks to the crowning of the contour of the bearing surfaces 11, this effect is even greater if the mating surface which is designated by 17 in FIG. 4 and against which the cutting insert 7 is pressed by the force of the clamping shoe 15 does not run perpendicularly to the boundary surface 35 but rather is inclined toward the boundary surface 35, i.e. is recessed, at a small angle of inclination, for example about 4°.

The invention claimed is:

1. An indexable cutting insert which is provided with at least two bearing surfaces for securing it to a holder, said bearing surface being each subdivided into individual subsurfaces,
   wherein the at least two bearing surfaces, with respect to a center plane of the cutting insert, each form at least three edges in one half of said cutting insert, said edges bounding the subsurfaces for the formation of crowning, approximating to convexity, of the at least two bearing surfaces,
   wherein the at least two bearing surfaces are each bounded by three respective edges in both halves, starting from the center plane, of the cutting insert, such that the at least two bearing surfaces of the cutting insert are each subdivided into five subsurfaces, and
   wherein the at least two bearing surfaces are identically formed and arranged such that one bearing surface is provided for resting against a mating surface within the seat and that the other bearing surface is provided for pressing of a clamping shoe of the holder.

2. The indexable cutting insert as claimed in claim 1, wherein the two bearing surfaces are of identical configuration in both halves of the cutting insert.

3. The indexable cutting insert as claimed in claim 2, wherein a central subsurface extending on both sides of the center plane defines a plane perpendicular to the center plane.

4. The indexable cutting insert as claimed in claim 3, wherein planar subsurfaces adjoin the central subsurface on both sides, said subsurfaces forming inner secondary surfaces which are wider than the central subsurface and are set back relative to the latter in each case by a first angle of inclination.

5. The indexable cutting insert as claimed in claim 4, wherein planar outer secondary surfaces which are set back relative to the central subsurface in each case by a second angle of inclination adjoin, as further subsurfaces, the inner secondary surfaces.

6. The indexable cutting insert as claimed in claim 5, wherein the magnitude of the second angle of inclination is a multiple of the magnitude of the first angle of inclination.

7. The indexable cutting insert as claimed in claim 6, wherein the second angle of inclination is about five times larger than the first angle of inclination.

8. The indexable cutting insert as claimed in claim 4, wherein the first angle of inclination is about 4°.

9. The indexable cutting insert as claimed in claim 5, wherein the inner and outer secondary surfaces have approximately the same width, which corresponds to about three times the width of the central subsurface.

10. A tool system consisting of tool holder and cutting tool, wherein the cutting tool is an indexable cutting insert which is provided with at least two bearing surfaces for securing it to a holder, said bearing surface being each subdivided into individual subsurfaces,
   wherein the at least two bearing surfaces, with respect to a center plane of the cutting insert, each form at least three edges in one half of said cutting insert, said edges bounding the subsurfaces for the formation of crowning, approximating to convexity, of the at least two bearing surfaces, wherein the at least two bearing surfaces are each bounded by three respective edges in both halves, starting from the center plane, of the cutting insert, such that the at least two bearing surfaces of the cutting insert are each subdivided into five subsurfaces, and wherein the at least two bearing surfaces are identically formed and arranged such that one bearing surface is provided for resting against a mating surface within the seat and that the other bearing surface is provided for pressing of a clamping shoe of the holder.

11. The tool system as claimed in claim 10, wherein the tool holder comprises a holder and a clamping shoe mounted on the holder, wherein the clamping shoe comprises a sloping surface facing the cutting insert, said sloping surface exerting a force on an outer secondary surface of the cutting insert.

12. The tool system as claimed in claim 10 or 11, wherein the cutting insert comprises at least two identical bearing surfaces and is arranged in a seat provided in the holder such that the second outest secondary surface of a bearing surface are pressed against a mating surface within the seat.

13. The tool system as claimed in claim 12, wherein the mating surface runs at an angle slightly different from 90° with respect to a lateral boundary surface of the seat.

\* \* \* \* \*